United States Patent [19]
Henderson

[11] 3,777,889
[45] Dec. 11, 1973

[54] CARTRIDGE FILTER UNIT
[75] Inventor: Robert A. Henderson, Rosemount, Minn.
[73] Assignee: Ecodyne Corporation, Chicago, Ill.
[22] Filed: Apr. 5, 1972
[21] Appl. No.: 241,179

[52] U.S. Cl. .............................. 210/135, 210/136
[51] Int. Cl. ...................... B01d 35/14, B01d 27/10
[58] Field of Search ................... 210/133, 134, 135, 210/136

[56] References Cited
UNITED STATES PATENTS
| | | | |
|---|---|---|---|
| 1,657,173 | 1/1928 | Morrison | 210/135 |
| 2,432,178 | 12/1947 | Shafer | 210/135 X |
| 3,306,451 | 2/1967 | Kuplaty | 210/136 X |

Primary Examiner—Frank A. Spear, Jr.
Attorney—Charles M. Kaplan et al.

[57] ABSTRACT

A self contained filter unit comprising a head having diametrically opposed horizontal inlet and outlet passages separated by a partition wall, a filter cartridge removably attached to the head for communicating the inlet passage with the outlet passage, a ball valve member having an elbow-shape flow passage formed therein mounted within the inlet passage effective to selectively direct fluid passing therethrough into the filter cartridge, and a check valve member mounted within the outlet passage effective to permit fluid flow from the filter cartridge to the outlet passage and prevent fluid flow from the outlet passage to the filter cartridge. The ball valve member is provided with an O-ring sealing assembly which prevents the upstream O-ring from blowing out at high pressures.

10 Claims, 1 Drawing Figure

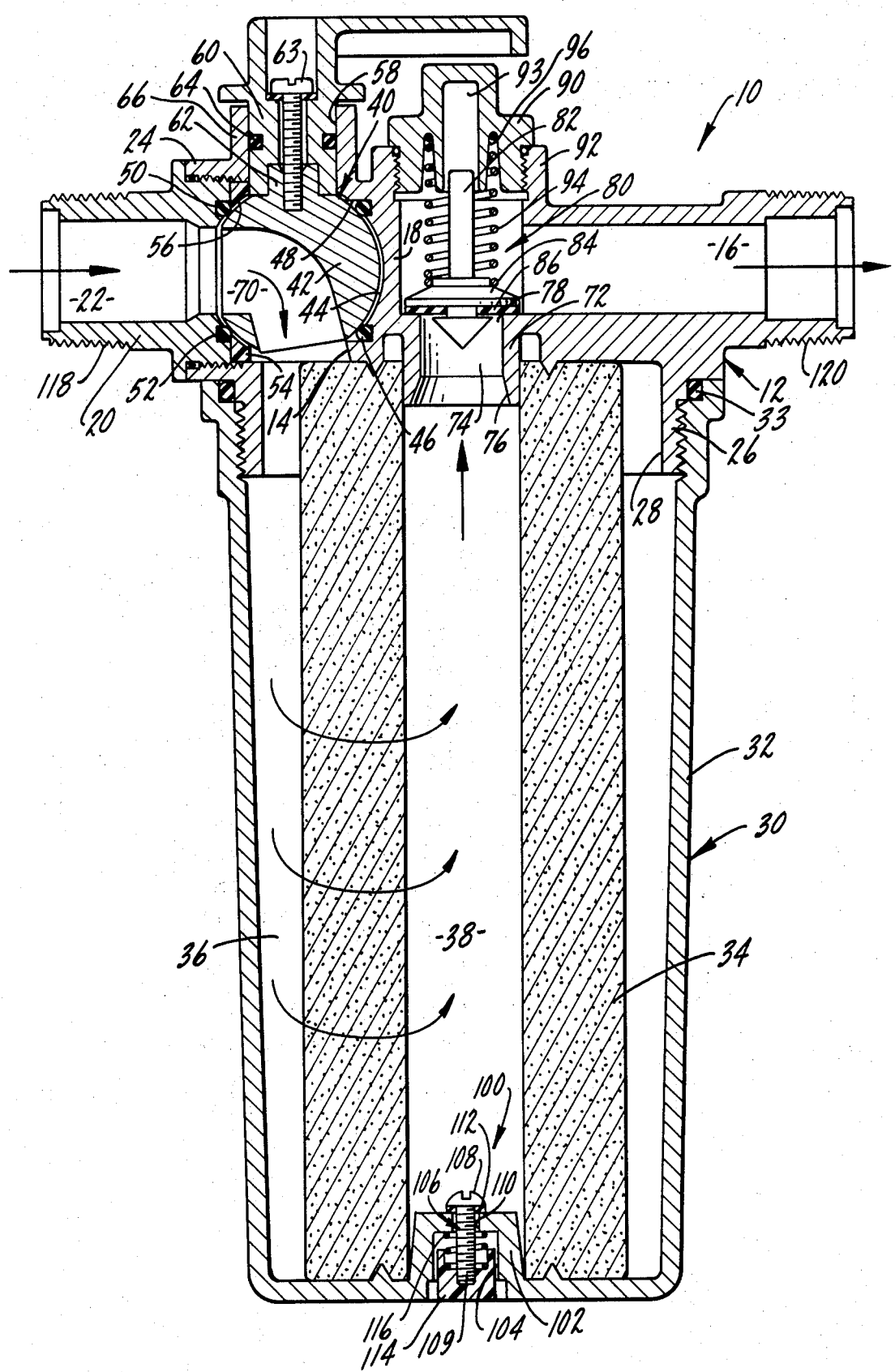

CARTRIDGE FILTER UNIT

BACKGROUND AND SUMMARY OF THE INVENTION

This invention relates to filtering units and more particularly to a self contained filter cartridge unit designed for under sink installation.

The filter unit of the present invention is of the type which may be installed on the cold water supply line below the kitchen sink. This type of unit may be provided with a sediment filter cartridge element for filtering sediment from the water or a taste and odor filter cartridge element for removing objectionable taste and/or odor from the water. The heretofore known filter cartridge units of this type have required professional installation thereof including the separate installation of an upstream inlet gate valve and a downstream outlet gate valve. This frequently becomes very difficult if not impossible because of the lack of space below the sink.

It is therefore a primary object of the present invention to provide a self contained cartridge filter unit for easy under-sink installation.

Another object of the invention is to provide a cartridge filter unit, having a built in shut-off valve and check valve, that is compact and inexpensive to manufacture.

A further object of the invention is to provide a self contained filter cartridge unit that is reliable in operation and holds to a minimum the pressure drop thereacross.

In accordance with the present invention a filter unit is provided comprising a head having diametrically opposed horizontal inlet and outlet passages separated by a partition wall, a filter cartridge removably attached to the head for communicating the inlet passage with the outlet passage, a ball valve member having an elbow-shape flow passage formed therein mounted within the inlet passage effective to selectively direct fluid passing therethrough into the filter cartridge, and a check valve member mounted within the outlet passage effective to permit fluid flow from the filter cartridge to the outlet passage and prevent fluid flow from the outlet passage to the filter cartridge. The ball valve member is provided with an O-ring sealing assembly which prevents the upstream O-ring from blowing out at high pressures.

BRIEF DESCRIPTION OF THE DRAWING

Other objects and features of the invention will become apparent to those skilled in the art as the disclosure is made in the following description of a preferred embodiment of the invention, as illustrated in the accompanying sheet of drawing, in which:

The FIG. is an elevation in cross section of a filter unit of the present invention with the ball valve member in its open position and the check valve member in its closed position.

DESCRIPTION OF A PREFERRED EMBODIMENT

Referring to the Figure, filter unit 10, in accordance with an exemplary embodiment of the present invention, includes a head 12 having an inlet passage 14 and an outlet passage 16 formed therein in a diametrically opposed horizontal relationship. Separating inlet passage 14 from outlet passage 16 is a partition wall 18 formed integrally within head 12. An inlet fitting 20, having a bore 22 aligned with inlet passage 14 is threadably engaged with internally threaded annular flange 24.

Head 12 has an annular flange 26 extending downwardly therefrom with an internal bore 28. Flange 26 is externally threaded to threadably engage with housing 32 of filter cartridge 30. A suitable seal, for example, an O-ring 33, effects a fluid seal between the head 12 and filter cartridge 30. Filter cartridge 30 includes a housing 32 and a hollow filter element 34 positioned therein so as to divide cartridge 30 into an outer chamber 36 and an inner chamber 38.

Inlet passage 14 and partition wall 18 are formed to receive an inlet valve assembly 40 for controlling fluid flow between inlet passage 14 and outer chamber 36 of cartridge 30. Valve assembly 40 includes a ball valve member 42 rotatably mounted within inlet passage 12 and partially received within a socket 44 formed on the outer surface of wall 18. An O-ring seal 46, partially recessed within annular groove 48, seals the downstream side of ball 42. An O-ring seal 50, partially recessed within annular groove 52 in fitting 20, seals the upstream side of ball 42. Annular retaining ring 54 is provided to partially close off a portion of groove 52 and thereby prevent O-ring 50 from blowing out at high pressures which may be encountered during the operation of unit 10. Ring 54 includes an inner surface 56 of spherical form for receipt and support of ball 42. Passing through opening 58 in head 12 is a stem 60 secured to stub 62, integral with ball 42, by screw 63 for rotating ball 42 about a vertical axis. An O-ring 64 partially recessed in stem 60 contacts upwardly extending annular flange 66, which defines opening 58, and thereby prevents fluid from exiting therefrom.

Formed within ball 42 is an elbow-shape flow passage 70. With ball 42 in a first or open position, as seen in the Figure, one end of passage 70 is in fluid communication with bore 22 and the other end is in fluid communication with outer chamber 36 of cartridge 30. Rotation of stem 60 permits movement of ball 42 to a second or closed position which closes off the inner end of bore 22 and prevents th passage of fluid into chamber 36. Elbow-shape passage 70 is effective to save space and to reduce the resulting pressure drop in changing the direction of the fluid flow.

Extending downwardly from a central portion of head 12 is an annular flange 72 defining a short connecting passage 74 therethrough. Filter element 34 frictionally engages the outer surface of flange 72 and chamber 38 is in fluid communication with the lower end 76 of passage 74. The upper end 78 of passage 74 is in fluid communication with outlet passage 16.

Positioned within inlet passage 16 in head 12 is check valve assembly 80 for controlling fluid flow between chamber 38 and inlet passage 16. Check valve assembly 80 includes a valve stem 82 having a valve stop member 84 secured thereto with a resilient sealing washer 86 attached to the underside thereof. Fitting 90 is threadably received by flange 92 integral with head 12. Fitting 90 includes a cavity 93 formed therein to slidably receive stem 82 and permit reciprocal movement therein. Spring 94, positioned about stem 82, has an upper end received within a circular recess 96 formed in fitting 90 and a lower end in contact with member 84. Spring 94 biases valve assembly 80 towards a first or closed position as in the FIGURE, with member 84 and washer 86 closing off fluid flow through upper end 78 of passage 74. Fluid pressure on the underside of check valve assembly 80 is effective to move stem 82 upward into cavity 93 against the bias of spring 94 to a second or open position permitting fluid flow between chamber 38 and outlet passage 16 via passage 74.

Fluid flow through the filter unit 10, as indicated by arrows in the Figure, is through bore 22 in fitting 20, thence along elbow-shape passage 70 into outer chamber 36 between housing 32 and filter element 34. Fluid then flows through the filter element 34 into inner chamber 38. When the pressure differential across check valve assembly 80 is sufficient to move stem 82 into cavity 93 and member 84 to its open position above passage 74 against the bias of spring 94, the fluid flows through passage 74 into outlet passage 16.

To close off fluid flow through filter unit 10, stem 60 is rotated moving ball valve 42 from its open position, as in the Figure, to its closed position, closing off fluid flow between bore 22 and inlet passage 14. This is effective to reduce the pressure differential across check valve assembly 80 such that the bias of spring 94 causes member 84 and washer 86 to seat on the upper end of flange 72 and thereby close off fluid flow between inlet 16 and chamber 38.

With valve assemblies 40 and 80 in their closed positions filter elements 34 may be replaced without fluid downstream from check valve assembly 80 passing through passage 74. This is done by disengaging filter cartridge 30 from head 12 by unscrewing housing 32 from flange 26. The filter element 34 is then replaced and housing 32 of filter cartridge 30 is again secured to flange 26. Valve assembly 40 may then be returned to its open position to continue fluid flow through unit 10.

Referring to the Figure, a pressure relief and drain assembly 100 is provided at the bottom surface of housing 32 to equalize the pressure within filter cartridge 30 prior to removal thereof from head 12 to replace filter element 34. Formed integral with a central portion of the bottom of housing 32 is an upstanding stub portion 102 having a cavity 104 formed therein. Stub portion 102 serves the dual function of positioning element 34 and supporting pressure relief assembly 100. Assembly 100 includes a screw member 106 having a head portion 108 and a shank portion 109, which passes through an aperture 110 in stub portion 102. Head 108, positioned within chamber 38 above stub 102, has a resilient sealing washer 112 secured thereto to close off aperture 110. Secured to the lower end of shank portion 109 is button member 114 positioned within cavity 104. Spring 116 biases button member 114 away from aperture 110 and thereby forces sealing washer 112 into a closing position thereabove. Prior to unscrewing housing 32 from flange 26, the button member 114 is pushed inward against the bias of spring 116 to raise screw 106 and washer 112 into chamber 38 above member 102 and thereby permit equalization of pressure between chamber 38 and atmosphere through aperture 110. This prevents a sudden spurt of water upon removal of housing 32 from head 12.

The installation of filter unit 10 is further simplified by providing external threads about the outer ends of fitting 20 and the portion of head 12 defining outlet passage 16, as indicated respectively 118 and 120 in the Figure. Threaded portions 118 and 120 are designed to receive conventioanl universal couplings which are used to connect portions 118 and 120 into the water supply line. Since filter unit 10 is self contained there is no need to install in-line inlet and outlet valves. Due to the elimination of external in-line valves and the unique structural relationship of valve assemblies 40 and 80, filter unit 10 is very compact and thereby particularly suitable for under-sink installation.

Filter element 34 may be of the type designed to remove objectionable taste and/or odor from the water or of the type designed to remove sediment from the water. These types of filter elements are well known in the art and therefore do not require detailed disclosure herein.

It should be understood of course, that the foregoing disclosure relates to only a preferred embodiment of the invention and that numerous modification or alterations may be made therein without departing from the spirit and the scope of the invention as set forth in the appended claims.

What is claimed is:

1. A filter for filtering fluids, comprising: a head having an inlet passage and an outlet passage; a filter cartridge removably attached to said head for communicating said inlet passage with said outlet passage; a first valve means associated with said inlet passage and positioned within said head for selectively opening and closing fluid communication between said inlet passage and said filter cartridge; and a second valve means associated with said outlet passage and positioned within said head for opening and closing fluid communication between said outlet passage and said filter cartridge; said inlet passage and said outlet passage being diametrically opposed to one another and when said first and second valve means are in their open positions fluid entering said inlet passage passes through said first valve means into said filter cartridge for filtering and then out said filter cartridge through said second valve means to said outlet passage; said filter cartridge being positioned below said first valve means and said first valve means including a ball valve member, rotatably mounted in said head, having an elbow-shape flow passage formed therein effective to direct fluid passing therethrough into said filter cartridge when in said open position; said ball valve member having downstream sealing ring means associated therewith which is partially recessed into a groove formed in said head and upstream sealing ring means associated therewith which is recessed into a groove formed in said head concentric with said inlet passage, said upstream sealing ring means having annular retainer ring means associated therewith for preventing said upstream sealing ring means from blowing out at high pressures.

2. The invention as defined in claim 1 wherein said filter cartridge is of the outside-in flow type and said head includes a connecting passage formed therein for directing fluid flow from an inner chamber of said filter cartridge to said outlet passage.

3. The invention as defined in claim 2 wherein said second valve means includes a valve member associated therewith having an open position permitting fluid flow through said connecting passage and a closed position preventing fluid flow through said connecting passage, said valve member being biased towards said closed position until the fluid pressure within said inner chamber of said filter cartridge is sufficient to move said valve member into said open position against said bias.

4. The invention as defined in claim 3 wherein spring means biases said valve member towards said closed position.

5. A filter for filtering fluids comprising a head having a substantially horizontal inlet passage and a substantially horizontal outlet passage in a diametrically opposed relationship to one another, said head havin a partition wall integral therewith between said inlet and outlet passages, a filter cartridge of the outside-in flow type removably attached to said head below said inlet and outlet passages for communicating said inlet passage with said outlet passage, said inlet passage being in fluid communication with an outer chamber of said filter cartridge and said outlet passage being in fluid communication with an inner chamber of said filter cartridge, a first valve means associated with said inlet passage and positioned within said head for selectively opening and closing fluid communication between said inlet passage and said outer chamber of said filter cartridge, said first valve means includes a ball valve member, rotatably mounted within said head, said ball valve member having an elbow-shape flow passage formed therein effective to receive horizontal fluid flow from said inlet passage at one end and to exit vertical fluid flow to said filter cartridge at the other end, a substantially vertical connecting passage formed integral with said head for directing fluid flow from said inner chamber of said filter cartridge to said outlet passage, said head includes a first circular groove formed therein for receipt of upstream sealing ring means positioned to contact said ball valve member and annular retainer ring means positioned about said ball valve member effective to partially close off said first groove and thereby prevent said upstream sealing ring means from blowing out at high pressures, and a second valve means associated with said connecting passage and mounted within said head for opening and closing fluid communication between said outlet passage and said filter cartridge, said second valve means includes a check valve member movable between an open position permitting fluid flow through said connecting passage and a closed position preventing fluid flow therethrough, said valve member being biased towards said closed position until the pressure differential across said check valve member is sufficient to move said valve member into said open position against said bias.

6. The invention as defined in claim 5 wherein said partition wall includes a socket formed therein for receipt of a portion of said ball valve member, said socket having a second circular groove formed therein for receipt of downstream sealing ring means.

7. The invention as defined in claim 5 wherein said check valve member includes a valve stem portion and a valve stop portion, said check valve member being positioned within said head so as to permit reciprocal movement thereof between said open position wherein said valve stop member is spaced from said connecting passage and said closed position wherein said valve stop member closes off the upper end of said connecting passage.

8. The invention as defined in claim 7 wherein spring means biases said check valve member towards said closed position.

9. The invention as defined in claim 5 wherein said filter cartridge includes a housing which is releasably secured to said head below said inlet and outlet passages and a disposable filter element positioned within said housing so as to define said outer chamber in communication with said inlet passage and said inner chamber in communication with said connecting passage.

10. The invention as defined in claim 9 wherein said housing includes means associated therewith for selectively equalizing the pressure with said filter cartridge.

* * * * *